United States Patent Office 3,704,221
Patented Nov. 28, 1972

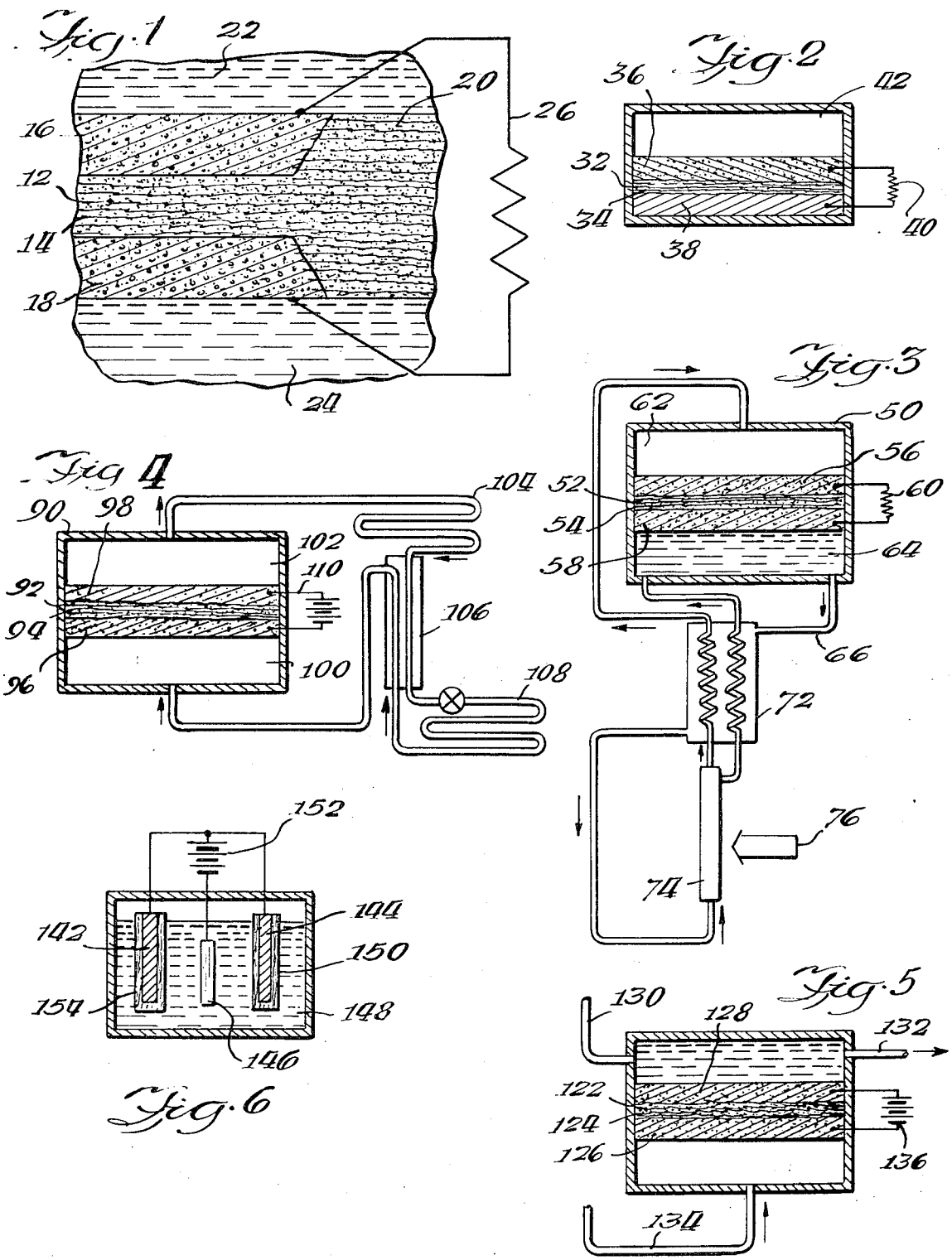

3,704,221
MEDIUM FOR IONIC TRANSPORT
Charles Roland McCully, Prospect Heights, Ill.; Roland
A. McCully, executor of Charles R. McCully, deceased
Filed Nov. 9, 1967, Ser. No. 681,855
Int. Cl. B01k 3/10
U.S. Cl. 204—295
30 Claims

ABSTRACT OF THE DISCLOSURE

In an electrochemical device, such as a galvanic cell, or an electrolytic cell, there is provided a non-aqueous medium which serves as a barrier to liquid flow while permitting transport of ions. The medium is made of a porous inert retention agent impregnated with a non-aqueous solution of an ionic material containing the ion to be transported. In most cases, the porous inert retention agent is made of mineral fibers, which may be bonded together by a fluorocarbon resin. Less preferably, a porous structure of mineral particles bonded together by a fluorocarbon resin may be substituted for the fibrous matte.

---

The mineral fibers, or particles, are chemically inert and electrically non-conductive, and for most applications, the porous inert retention agent has interstices no greater than about 50 microns.

In most applications there is a porous structure on at least one side of the porous inert retention agent which may serve as an ion collector, or as an electrode. This porous structure is made of an electrically conductive material. To avoid the loss of electrolyte from the inert retention agent by capillarity, the adjacent porous structure has interstices or pores, larger than the interstices of the retention agent.

There are electrochemical devices and processes in which liquid materials are used and in which the transport of certain ions to or from the liquid materials is required while the flow of the liquid material itself is to be prevented or minimized. In such devices and processes, membranes or other barrier materials have been used to prevent the mixing of liquid components of the system while permitting ion exchange; and such systems have been successful in achieving ionic transport through a membrane in aqueous systems.

However, when the desired system includes components which are reactive with water, aqueous systems for ionic transport are unsuitable and anhydrous systems must be used. In anhydrous systems the barrier materials, or ionic transport media, developed prior to this invention have had serious practical disadvantages.

Most anhydrous ionic transport media are inefficient for the transport of ions and tend to afford low ionic conductivity. In addition, most anhydrous media which utilize molten salt electrolytes require operating temperatures which are inconveniently high and which may not be suitable for the desired electrochemical system.

Ionic transport media made of porous ceramic material or porous glass are usually too friable to be mechanically durable in the thin layers required for high ion transport rates, particularly in the case of large scale devices.

In accordance with this invention there is provided a non-aqueous medium for ionic transport comprising an inert porous retention agent impregnated with an electrolyte, said inert porous retention agent being selected from the group consisting of mattes of mineral fibers and fluorocarbon resin-bonded composites of mineral particles, said mineral fibers and particles being chemically inert and electrically non-conducting, and said electrolyte comprising a mixture of an ionic salt containing the ion to be transported and a solvent therefor. The solvent is generally inorganic.

In most applications the impregnated porous retention agent is sandwiched between two porous structures, each of which is made of an electrically conductive material; and the porous structures serve as ion collectors. In some applications, a porous structure adjacent to the impregnated fibrous matte may serve as an electrode.

In some instances (e.g., the application of FIG. 2, described below), there is only one porous structure adjacent to the inert porous retention agent and a solid non-porous structure, such as a consumable metal electrode is on the other side. And in other cases (e.g., the application of FIG. 6, described below), there is no porous structure on either side of the inert porous retention agent.

The ionic transport medium of this invention permits the achievement of satisfactory transport of selected ions in an anhydrous system over a wide temperature range while barring the transport of liquid material therethrough. The medium possesses high chemical stability and satisfactory physical strength while retaining desirable characteristics of flexibility.

Where the ion to be transported is a halide ion, for example, the electrolyte may comprise a mixture of an alkali metal halide as the ionic salt, and a chloride, fluoride, or bromide of aluminum or zinc as the solvent therefor. Such compositions have relatively low melting points, particularly at concentrations approaching the eutectic compositions.

In the preferred embodiment, where the porous retention agent is a fibrous matte, it may comprise such mineral fibers as asbestos fibers or glass fibers, and may be woven or non-woven. When a matte is non-woven, the fibers are preferably bonded to each other by a fluorocarbon resin such as polytetrafluoroethylene.

The particular embodiments of the present invention are illustrated in the accompanying drawings in which:

FIG. 1 is a diagrammatic cross-sectional segment, greatly enlarged, showing the overall relationship of the ionic transport medium to a porous cathode collector and a porous anode collector positioned to either side thereof;

FIG. 2 is a diagrammatic cross-section view illustrating the application of the ionic transport medium of this invention to a high specific energy battery;

FIG. 3 is a diagrammatic cross-section view illustrating the application of the ionic transport medium of this invention in a system for thermoelectrochemical power supply;

FIG. 4 is a diagrammatic cross-section view illustrating the application of the ionic transport medium of this invention in a system for electrochemical cooling;

FIG. 5 is a diagrammatic cross-section view illustrating the application of the ionic transport medium of this invention in an electrolytic cell for the chlorination of an organic compound; and FIG. 6 is a diagrammatic cross-sectional view illustrating the application of the ionic transport medium of this invention in a system for electroplating a metal.

As shown in FIG. 1, the ionic transport medium of this invention will ordinarily comprise a fibrous matte 12, which serves as an inert porous retention agent, impregnated with an electrolyte 14, which serves to transport selected ions. On one side of the fibrous matte, there is a cathode collector 16, and on the other side there is an anode collector 18. The cathode collector 16 is a porous material having open and interconnected pores or interstices larger than those of the fibrous matte. Preferably, the pores of the cathode collector occupy about 50 percent of the overall volume thereof. Thus, the cathode collector is left open to ready access by the cathode fluid 22 which is in the space beyond the cathode collector.

Similarly, the anode collector 18 is also porous with larger pores than those of the fibrous matte, so that it is left open to ready access by the anode fluid 24.

In any operating system means must be provided for holding the barrier material, or ionic transport medium, in place. For this purpose, there is a structural area 20 around the edge of the ionic transport medium which serves to affix the medium into the incident system by attachment to a fixed element therein. The preparation of the structural area is described below.

An external circuit and load 26 is connected between the anode collector 18 and the cathode collector 16.

In operation as a spontaneous process, molecules or atoms of the anode fluid 24 give up electrons to the anode collector 18, charging said collector to a characteristic potential. At the same time, electrons reach cathode collector 16 via the external circuit 26 and are transferred to atoms or molecules of the cathode fluid 22 to form negative ions therefrom.

The negative ions formed at the cathode collector are transported by migration and diffusion through the fibrous matte 12 via the electrolyte 14 and serve to neutralize the charge around anode collector 18, which charge was created by the positive ions formed from the anode fluid 24.

The net result of the process is the production of electrical energy by means of a reaction that has occurred between cathode fluid 22 and anode fluid 24 without intermixture thereof.

The system of FIG. 1 may also be operated as an electrolytic process if the load of external circuit 26 is replaced by a power supply to put electrical energy into the system, instead of taking it out.

The fibrous matte, or retention agent, 12 is generally maintained as thin as possible to reduce the total migration path for the selected ions in the electrolyte 14 to a practical minimum. In some cases, the thickness of the fibrous matte may be only a few microns, but usually thicknesses from about 25 microns to about 250 microns will be used, depending on the physical stress of the intended application.

The fibrous matte may comprise a finely woven matte of glass fibers or asbestos fibers, or a felted non-woven matte of the same materials. However, in most cases it is desirable to reinforce the matte, particularly when it is non-woven, by a suitable bonding agent. Fluorocarbon resins such as polytetrafluoroethylene, polychlorotrifluoroethylene and polyfluoroethylene-propylene are suitable bonding agents because of their chemical inertness.

When fluorocarbon resins are used as bonding agents to reinforce the fibrous matte, it is desirable to limit the area of contact between the fluorocarbon resin and the fibers of the matte and to avoid complete coverage of the fibers by the fluorocarbon resin. Coverage of the fibers by the fluorocarbon would reduce the wettability of the fibers by the electrolyte, and thus reduce the effectiveness of the ionic transport medium.

It has been found to be advantageous to coagulate the fluorocarbon resin to some extent prior to application to the fibrous matte so that the matte contains a lesser number of relatively large particles of fluorocarbon resin rather than a greater number of small particles. It has been found to be advantageous to disperse the fluorocarbon resin in a liquid vehicle which produces some coagulation prior to mixing the resin into the fibrous matte. Alcohols, such as methanol and ethanol, and chlorinated solvents, such as chloroform and carbon tetrachloride, have been found to be effective vehicles, but aqueous systems containing a small amount of wetting agent may also be used if the degree of coagulation is regulated. It is preferred to use resin dispersions coagulated to the extent that the average agglomerate particle size is at least 35 microns.

In making a fibrous matte from a fluorocarbon resin dispersion having coagulated particles, the fibers are mixed into the dispersion and the matte is formed by felting the fibrous mixture into sheet form, followed by drying the sheet and sintering the fluorocarbon resin to the proper temperature while the sheet is confined under pressure. When the bonded fibrous matte is made in this manner, the fluorocarbon resin is confined primarily to the junction points of the fibers and other areas are left uncovered by the fluorocarbon resin to permit good wetting by the electrolyte.

The structural area 20, for holding the inert porous retention agent in place, is usually made in a unitary structure with the porous retention agent. A very effective structural area can be obtained from the same mineral fiber and fluorocarbon resin components as the retention agent, but with a substantially higher fluorocarbon resin content. Fluorocarbon resin contents of about 75% by weight are suitable, although lower concentrations, such as about 50%, are suitable.

The inert porous retention agent and the structural area may be made in a single felting and sintering operation by maintaining a temporary barrier in the structure prior to sintering to separate the material in the high resin area from the material in the low resin area. Or if desired, the entire structure may be felted and sintered at a low resin content and thereafter additional resin may be added to the structural area and subjected to a second sintering operation.

The function of the fibrous matte is to hold the electrolyte in place against the force of gravity and against differential forces and to operate together with the electrolyte as a barrier against downward flow or mixing of liquids. The size of the interstices in the fibrous matte, or the effective pore diameters therein will be determined by the forces operating to displace the electrolyte from its desired position. In most cases, the surface tension between the electrolyte and the atmospheres in contact therewith ranges from about 15 to 40 dynes per centimeter with lower surface tensions prevailing at higher temperatures. For such applications effective pore diameters in the range of about 50 microns will be satisfactory.

In applications wherein there is a high differential pressure tending to displace the electrolyte, the maximum permissible pore diameter may be much lower, as for example, less than 1 micron to 0.1 micron or even 0.01 micron.

Conversely, in applications wherein there is a solid, non-porous structure on one side of the inert porous retention agent, the forces tending to displace the electrolyte can be very low, and larger pores are permissible.

The electrolyte is a non-aqueous mixture containing an ionic salt of the ion to be transported in a suitable solvent therefor which is usually a normally solid inorganic material, and usually a non-ionic or slightly ionic anhydrous salt.

When a chloride ion is to be transported, for example, the ionic salt may suitably be an alkali metal or alkaline earth metal chloride, or a tetraalkylammonium chloride. Suitable solvent materials in this case include aluminum and zinc chlorides.

In some instances, it may be desirable to include in the electrolyte a minor constituent which will increase its ionic conductivity. Suitable materials for this purpose include tetraalkyl- and tetraarylammonium chlorides and bromides. For example, when the ionic salt of the electrolyte system is sodium chloride, the addition of a small amount of sodium fluoride, or tetramethylammonium chloride will enhance the ionic conductivity of the system.

In most cases, it is desirable to blend the ionic salt and the solvent in proportions at or close to the eutectic composition so that the electrolyte will be liquid at relatively low temperatures. However, substantial variations from the eutectic compositions may be employed without raising the melting points to impractical levels.

For example, eutectics of aluminum chloride and one or more of the alkali metal chlorides usually contain from about 60 to about 65 mole percent of $AlCl_3$. The eutectic with NaCl, for example, melts at about 112° C., but the $AlCl_3$ content can be lowered to 50 mole percent while raising the melting point to only about 185° C.

In the case of the ternary eutectic of $AlCl_3$ with NaCl and KCl, melting at about 93° C., varying the $AlCl_3$ content between about 58 and about 62 mole percent will still provide electrolyte melting points below 100° C.

Similar relationships have been found to hold true for compositions of $AlCl_3$ with three alkali metal chlorides, or with three alkali metal chlorides and a tetraalkylammonium chloride. For example, a composition of about 50.2 mole percent of $AlCl_3$ with about 17 mole percent of KCl, about 15.4 mole percent of NaCl, about 15.4 mole percent of LiCl, and about 2.4 mole percent of $(CH_3)_4NCl$ has a melting point of about 73° C.

In this instance, the small amount of $(CH_3)_4NCl$ (tetramethylammonium chloride) serves to increase the ionic conductivity of the electrolyte by about 25% to a value of about 0.15 $ohm^{-1}cm.^{-1}$ at temperatures just above the melting point, or to a value of about 0.7 to 0.8 $ohm^{-1}$ $cm.^{-1}$ at a temperature of about 125° C.

The presence of the tetramethylammonium chloride in this instance also increased the ionic conductivity of the electrolyte system in solid state. The ionic medium of this invention may be used under conditions wherein the electrolyte remains in solid state, although liquid phase electrolytes (under operating conditions) are preferred because of their higher ionic conductivity.

When the electrolyte is in solid state, the ionic transport medium may gradually polarize. For example, a galvanic cell, operating with a solid state electrolyte and employing the ionic transport medium of this invention, may drop after 24 hours of continuous operation from an initial voltage of 2.15 to a voltage of 1.7. Heating this cell to bring the electrolyte in the ionic transport medium to a temperature above its melting point depolarizes the transport medium and restores the original voltage.

Other minor constituents which may be used to enhance the solid state conductivity of the electrolyte include alkaline earth chlorides, such as $MgCl_2$.

In the embodiment of FIG. 1, the ionic transport medium is sandwiched between a porous cathode collector 16 and a porous anode collector 18. The collectors are made of electronically conductive material and are so constructed that they afford ready access and a large surface area to fluids which must approach or make contact with the electrolyte in order to establish the proper function of the ionic transport medium.

Thus, the collectors are usually immediately adjacent to the surface of the ionic transport medium. In this position, the collectors might draw electrolyte out of the fibrous matte by capillarity or by better wettability; and to guard against this, the collectors are provided with pores larger than those of the fibrous matte of the ionic transport medium.

Usually it is desirable that a substantial portion of the pore volume, corresponding to at least 20 percent by volume of the volume of the collector, and preferably at least 50 percent, be represented by large pores, larger in effective diameter than the pores in the adjacent fibrous matte of the ionic transport medium. The pore volume may run as high as 90 percent of the volume of the collector, the only limitations being the structural strength of the remaining porous structure and the amount of solid surface remaining in the collector to be wetted by the appropriate fluids in the performance of its collector function.

Suitable materials for the collectors are chemically inert, electrically conductive materials such as carbon, graphite, nickel, monel and tantalum. Metals of the platinum group are suitable where the properties of these metals are needed enough to justify the cost.

Desirable porous structures for the collectors can be obtained by weaving when the materials are in fiber form, or by felting and bonding when the materials are in fiber or particle form. In the case of metals, the structures can be built by chemical or electrochemical deposition, by sputtering, or combination thereof.

Very satisfactory collectors may be formed by dissolution of one phase of a two-phase solid composition leaving a conductive network of the other phase which may comprise a suitable metal or a carbon or graphite composition. Raney nickel is a suitable collector of this type.

Or if desired, the collectors may be fabricated by utilizing a fluorocarbon resin to bond carbon or graphite to form a collector. The carbon or graphite may be in particulate or fibrous form, or in a combination thereof. The preferred compositions comprise about ⅔ to ⅘ (by weight) of graphite or carbon and about ⅕ to ⅓ bonding agent.

The porosity of the collectors may be enhanced by the incorporation of particulate materials into the composition prior to bonding or sintering and the leaching out of the particulate material after bonding or sintering.

Desirably, the collectors will include a fine pore structure for catalytic effect as well as the coarse pore structure described above. A fine pore structure may be incorporated by including porous particulate materials or porous fibrous materials among the constituents to be felted into the porous structure of the collector. If desired, the collector may embody a heterogeneous catalytic system, as for example, by the deposition of platinum or nickel on a porous graphite structure.

The collectors are bonded to the surfaces of the inert porous retention agent, usually by a fluorocarbon resin, to provide a laminate of enhanced physical strength.

The nature of cathode fluid 22 and anode fluid 24 in FIG. 1 will vary with the particular application, and illustrative applications are described with reference to FIGS. 2 to 6.

From the above example, it may be seen that the factors controlling the current density through the ionic transport medium will include (1) the potential available, (2) electron transfer to collector 18 from anode chemical 24 and from collector 16 for cathode fluid 22, and (3) ionic transport through the inert porous retention agent via the electrolyte.

The inner surface of the collectors will be significantly wetted by a thin layer of the electrolyte, but the large pores of the collectors provide ready access of the cathode fluid 22 and the anode fluid 24 to the inner surfaces of their respective collectors.

FIG. 2 shows the application of the ionic transport medium of this invention in a battery of high specific energy based upon the aluminum-chlorine couple.

The battery includes, a cathode collector 36, an aluminum anode 38, a conductor and load system 40, a retention chamber 42 for gaseous chlorine, and an ionic transport medium consisting of porous retention agent 32 which is saturated with an electrolyte 34.

It is to be noted that in this application, there is only one porous structure adjacent to the ionic transport medium, the cathode collector. On the opposite side of the ionic transport medium there is the aluminum anode which requires no porosity and is consumable in this application.

In operation, the aluminum anode 38, in the presence of the negative ions of the electrolyte forms $Al^{3+}$ ions at the surface, releasing electrons which pass through the external load 40 to the cathode collector 36 where they serve to form $Cl^-$ ions from $Cl_2$ adsorbed on the collector surface which is wetted by the electrolyte 34. These $Cl^-$ ions are then transported via the electrolyte 34 to the anode 38 surface and are available to neutralize or react with the $Al^{3+}$ ions formed thereat.

It will be seen that the net effect of this operation is to produce $AlCl_3$ from aluminum and chlorine while supplying an electric current to the external load 40.

In this example, the retention agent 32 is a woven glass cloth 25 microns thick having an average pore size of about 50 microns, the electrolyte 34 is a mixture of $AlCl_3$ with NaCl, KCl and LiCl in proportions approaching the eutectic composition. However, the electrolyte composition will be altered as the battery is used since additional $AlCl_3$ is produced as a product of the process.

The cathode collector is a carbonized-graphitized cloth less tightly woven than the inert porous retention agent 32 and is about 50 microns thick.

The battery of FIG. 2 operates well at temperatures from about 70° C. to 200° C.

FIG. 3 shows the application of the ionic transport medium of this invention to a thermoelectrochemical power supply. This device includes as sub-assemblies, a galvanic cell system 50, a regenerative heat exchanger 72 and a thermal regeneration and product separation system 74.

The medium for ionic transport is a component of the galvanic cell 50 and comprises porous retention agent 52 which is saturated with electrolyte 54. The medium is sandwiched between cathode collector 56 and anode collector 58.

Both the cathode collector 56 and the anode collector 58 are porous and have surface wetted by electrolyte 54. The cathode collector 56 is also exposed to gaseous chlorine 62 and has chlorine absorbed in the electrolyte 54 on its surface.

The anode collector 58 is exposed to an anode liquid 64 which comprises a chloride, such as antimony pentachloride, which dissociates or disproportionates upon heating to give chlorine and a lower chloride, such as antimony trichloride, which is electrochemically reactive.

In operation, the lower chloride releases electrons to the anode collector surface and electrons are conducted via the external circuit and load 60 to the cathode collector 56 where they form $Cl^-$ ions from the chlorine which is absorbed on the cathode collector surface. The $Cl^-$ ions are transported to the anode collector vicinity via the electrolyte 54 and serve to neutralize ions of the lower chloride which formed at the anode collector surface and thereby form the higher chloride.

It may be seen that the net result of the operation in the galvanic cell is that the lower chloride and chlorine combine to form the higher chloride while supplying electric current to the external load 60.

Outside of the galvanic cell 50, anode liquid 64 is withdrawn through line 66 and passed through heat exchanger 72 to pick up heat from the hot chlorine and lower chloride streams passing countercurrent thereto, which streams are obtained as disclosed below.

The thus preheated anode fluid then flows into the thermal regeneration and product separation system 74 where additional heat, represented schematically by arrow 76, is added. The added heat decomposes the higher chloride content of the anode fluid into chlorine and lower chloride which are separated and passed as hot streams through the heat exchanger 72 and to the chlorine 62 and anode liquid 64 of the galvanic cell system.

It may be seen that the net effect of the overall system is to convert the heat added at 76 to the electric current supplied at load 60 while regenerating in the regeneration system 74 the chlorine and lower chloride consumed in the galvanic cell 50.

Typically, the fibrous matte, or inert porous retention agent 52, contains 50 percent by weight of asbestos fibers, 20 percent of glass fibers and 30 percent of fluorocarbon resin as bonding agent. It is about 125 microns thick and its pores comprise about 50 percent of its volume.

The fiber size and structure of the retention agent are such as to provide an average pore size of about 50 microns and the electrolyte is thereby retained therein against a differential pressure due to the chlorine at a level of 0.5 p.s.i.

The electrolyte has about 50 mole percent of $AlCl_3$, 20 mole percent of LiCl, 15 mole percent of NaCl, 12 mole percent of KCl and 3 mole percent of $(CH_3)_4NCl$. However, this composition will be altered by contact with the anode liquid (comprising the lower chloride) near the anode collector 58, and by contact with chlorine near the cathode collector 56. The fact that this electrolyte composition has relatively low solubility for antimony trichloride, antimony pentachloride and chlorine makes it particularly suitable in the application since the low solubility prevents rapid diffusion of the extraneous components into the electrolyte.

Both the anode collector 58 and the cathode collector 56 have 50 volume percent of interconnected pores with effective pore diameters averaging about 50 microns. The collectors are made from about 50 percent by weight of graphite powder, 25 percent of carbon powder and 25 percent of fluorocarbon resin and are about 65 microns in thickness.

FIG. 4 shows the application of the ionic transport medium of this invention to a system for electrochemical cooling. The system comprises as sub-assemblies, electrolytic cell 90, condenser 104, heat interchanger 106, evaporator 108 and electric power source 110.

The ionic transport medium is a component of the electrolytic cell 90 and comprises the porous retention agent 92 which is saturated with electrolyte 94. The retention agent is sandwiched between porous cathode 96 and porous anode 98, each of which is partially saturated with a liquid comprising the electrolyte 94.

In operation, electrons from the electric power source 110 bring about the formation of $Cl^-$ ions or $Cl^-$ bearing ions at the surface of the cathode 96 by action on easily reduced components of the liquid therein, such as antimony, pentachloride. These $Cl^-$ ions or $Cl^-$ bearing ions are transported via electrolyte 94 to the anode 98 where electrons are released and chlorine accumulates in the gaseous state.

This chlorine gas is cooled and condensed to liquid in the condenser 104, and then further cooled in heat exchanger 106. The liquid chlorine then passes into the lower pressure zone of evaporator 108 where it evaporates to provide cooling before it returns to the electrolytic cell via the heat exchanger 106.

It may be seen that the electrolytic cell performs the function of accepting chlorine 100 at a relatively low pressure and liberating chlorine 102 at a significantly higher pressure, thus effectively substituting for the pump in the conventional mechanical cooling device.

The medium for ionic transport in this instance must operate successfully against a high differential chlorine pressure which may typically be as high as 150 p.s.i. The inert porous retention agent may suitably comprise a base of one or more layers of woven glass cloth, a filler comprising fine asbestos fibers and glass fibers and 35 to 40 weight percent of a fluorocarbon resin, such as polytetrafluoroethylene as a bonding agent. This fibrous matte is about 250 microns thick with about 50 percent of its volume in pores, none of which have diameters exceeding 0.01 micron.

The anode 98 and the cathode 96 are similar in structure to collectors 58 and 56 of FIG. 3. The preferred electrolyte is the eutectic of $AlCl_3$, NaCl and KCl.

FIG. 5 shows the application of the ionic transport medium of this invention to a system for the chlorination of organic chemicals. The porous retention agent 122 is saturated with electrolyte 124 which also partially saturates the porous cathode 126 and the porous anode 128.

The porous cathode 126 is also exposed to chlorine gas 134 while the porous anode 128 is exposed to a chlorinatable organic chemical 130.

In operation, electrons from power source 136 bring about the reduction of a chloride from the electrolyte at the cathode surfaces resulting in $Cl^-$ ions or $Cl^-$ bearing ions being formed. These ions are transported via the electrolyte 124 in the inert retention agent, or fibrous matte 122 to the anode 128 where said ions are discharged to give chlorine atoms at the anode surfaces. The chlorine atoms react with the organic chemical 130 to produce the product 132. Electrons released to the anode 128 by the discharge of the Cl⁻ ions or Cl⁻ bearing ions are returned to the power source 136.

In this application, the inert porous retention agent 122, the electrolyte 124, the cathode 126 and the anode 128 all have compositions and structures similar to those of the respective porous retention agent 52, electrolyte 54, cathode collector 56 and anode collector 58 of FIG. 3.

Of course, other halogens and halides may be substituted for the chlorine and chlorides in this system to produce equally useful results. For example, bromine can replace chlorine 134 and bromides can replace the chlorides of the electrolyte 124.

FIG. 6 shows the application of the ionic transport medium of this invention to a system for electroplating. The system, generally indicated as 140, has as principal components the sacrificial anodes 142 and 144, the cathode 146 to be plated, and the electrolyte 148. In the case of each of the anodes 142 and 144 there is an inert porous medium, 154 and 150, respectively, surrounding the anodes and serving to prevent impurity particles, released during dissolution of anodes from entering the bulk electrolyte 148 and causing imperfections on the cathode 146 by taking residence thereon.

In operation of electroplating system 140 the power supply 152 accepts electrons from anodes 142 and 144 resulting in electron deficient surfaces thereon. Anions from electrolyte 148 migrate to these electron deficient surfaces resulting in stoichiometric dissolution thereof and resulting in formation of cations of anode 142 and 144 materials. These cations are transported through the electrolyte 148, via migration and diffusion, to the cathode 146 surface where they are discharged by electrons from power supply 152 and this process results in electrodeposition of anode 142 and 144 materials on the cathode 146. The electrolyte 148 saturates the pores of the inert media 150 and 154.

The electrolyte 148 may comprise the principal components mentioned for electrolyte 54 in the illustration of FIG. 3 and will contain cations of the anode 142 and 144 materials. If cations of the material to be electroplated, represent a major component of the electrolyte, as would be the case in the deposition of aluminum where the electrolyte may already contain aluminum ions or aluminum-containing ions in the low melting compositions of $AlCl_3$ and the alkali metal or alkaline earth metal chlorides, it is not necessary to supplement the electrolyte composition. Otherwise supplemental compositions must be added and, for example if copper is to be electroplated, the supplemental material can be $CuCl_2$ in the above mentioned chloride type electrolytes. There are also many other chlorides of elements less electropositive than aluminum which will have at least partial solubility in the above described chloride-type electrolytes. Such chlorides include but are not limited to chlorides of tungsten, molybdenum, chromium, tellurium, tin, and uranium.

The inert media 150 and 154 are usually applied to all sacrificial anodes in any one bath, as shown. Also anodes 142 and 144 would commonly have the same composition although this might not be the case in the electrodeposition of alloys. The inert media 150 and 154, in common with those discussed for previous applications, must be wetted by electrolyte 148 for most applications. However, in this instance the media need not have pore sizes determined by retention of the electrolyte 148 since they are in an electrolyte environment and their principal function is that of collecting impurity particles liberated in dissolution of anodes.

Where alloys are to be electroplated, the inert porous medium on one of the anodes may be omitted, or the anode of the least electropositive material may be enclosed in a medium more restrictive of transport of ions thereof than the other. These expedients serve as a means of controlling the plated composition.

For example, in a system for plating a copper-zinc composition, the more restrictive medium would be applied to the copper anode. The restriction to ion transport in such an instance can be attained by lower open cross section in the medium by lower wetting by the electrolyte as from increased fluorocarbon resin content, or by a combination of these techniques.

While the invention has been described above in connection with its most common applications and preferred embodiments, it will be apparent to those skilled in the art that other applications and embodiments may be used.

For example, the inert porous retention agent may be made entirely of particulate material bonded with fluorocarbon resin, if desired, instead of having a fibrous structure. Any natural or synthetic mineral particulate material may be used which is chemically inert and electrically non-conductive; and the fluorocarbon resins may be those described above. Glass powder and aluminum oxide powder in the range of about 80 to about 200 mesh are suitable and the fabrication is by compaction and bonding techniques well known to those skilled in the art.

The nature of the electrolyte may, of course, be altered as required by the nature of the ion to be transported. For example, to transport oxygen-containing ions, one may use mixtures of carbonate salts or mixtures of nitrate salts, the alkali metal and alkaline earth metal salts being preferred in each case. Compositions at or near the eutectic compositions for the particular mixtures used are preferred.

What is claimed is:

1. A non-aqueous medium for ionic transport comprising an inert porous retention agent impregnated with a non-aqueous electrolyte, said inert porous retention agent being selected from the group consisting of mattes of mineral fibers and fluorocarbon resin-bonded composites of mineral particles, said mineral fibers and particles being chemically inert and electrically non-conducting, and said electrolyte comprising a mixture of an ionic salt containing the ion to be transported and an inorganic solvent therefor.

2. The ionic transport medium of claim 1 wherein said inert porous retention agent is a woven matte.

3. The ionic transport medium of claim 1 wherein said inert porous retention agent is a non-woven matte bonded with a fluorocarbon resin.

4. The ionic transport medium of claim 4 wherein said matte is made by bonding mineral fibers with agglomerated fluorocarbon resin particles having an average particle size of at least 35 microns.

5. The ionic transport medium of claim 1 wherein said inert porous retention agent is a fibrous matte having interstices no larger than about 50 microns.

6. The ionic transport medium of claim 5 wherein said fibrous matte comprises fibers selected from the group consisting of glass fibers and asbestos fibers.

7. The ionic transport medium of claim 3 wherein said non-woven matte comprises a structural area at the periphery thereof, said structural area having a higher fluorocarbon resin content than the remainder of said matte.

8. The ionic transport medium of claim 1 wherein a porous structure is adjacent to at least one surface of said inert porous retention agent, said porous structure having larger pores than said retention agent and being made of an electrically conducting material.

9. The ionic transport medium of claim 8 wherein said inert porous retention agent is sandwiched between two porous structures, each having larger pores than said retention agent and being made of an electrically conducting material.

10. The ionic transport medium of claim 8 wherein said inert porous retention agent is sandwiched between a porous structure and a non-porous structure, said porous structure being in contact with and open to a source of ions to be transported.

11. The ionic transport medium of claim 9 wherein one of said porous structures is in electrical contact with one pole of an electrical load and the other porous structure in electrical contact with the other pole thereof.

12. The ionic transport medium of claim 9 wherein one of said porous structures is in electrical contact with one pole of an external source of electromotive force and the other porous structure is in electrical contact with the other pole thereof.

13. The ionic transport medium of claim 10 wherein said porous structure is in electrical contact with one pole of an electrical load and said non-porous structure is in electrical contact with the other pole thereof.

14. The ionic transport medium of claim 10 wherein said porous structure is in electrical contact with one pole of an external source of electromotive force and said non-porous structure is in electrical contact with the other pole thereof.

15. The ionic transport medium of claim 1 wherein said electrolyte comprises an ionic salt selected from the group consisting of alkali metal chlorides, alkaline earth metal chlorides, tetraalkylammonium chlorides and tetraarylammonium chlorides and said solvent is selected from the group consisting of aluminum chloride and zinc chloride.

16. The ionic transport medium of claim 9 wherein said electrolyte contains about 50 to 65 mole percent of aluminum chloride.

17. The ionic transport medium of claim 9 wherein said electrolyte comprises about 50.2 mole percent of aluminum chloride, about 17 mole percent of potassium chloride, about 15.4 mole percent of sodium chloride, about 15.4 percent of lithium chloride, and about 2.4 percent of tetramethylammonium chloride.

18. The combination including an inert porous retention agent suitable for a non-aqueous ionic transport medium in the form of a layer having a second porous layer adjacent to at least one surface thereof, said retention agent being selected from the group consisting of mattes of mineral fibers bonded with a fluorocarbon resin and fluorocarbon resin-bonded composites of mineral particles, said mineral fibers and particles being chemically inert and electrically non-conducting, and said second porous layer being made of an electrically conducting material and having larger pores than said retention agent.

19. The porous retention agent of claim 12 wherein said matte of mineral fibers is a non-woven matte.

20. The porous retention agent of claim 13 wherein said matte is made by bonding mineral fibers with agglomerated fluorocarbon resin particles having an average particle size of at least 35 microns.

21. The porous retention agent of claim 13 wherein said matte has interstices no larger than about 50 microns.

22. The porous retention agent of claim 15 wherein said mineral fibers are selected from the group consisting of glass fibers and asbestos fibers.

23. The porous retention agent of claim 13 wherein said non-woven matte comprises a structural area at the periphery thereof, said structural area having a higher fluorocarbon content than the remainder of said matte.

24. The combination of claim 18 wherein said retention agent is sandwiched between two porous structures, each being made of an electrically conducting material and having larger pores than said retention agent.

25. The ionic transport medium of claim 1 wherein said medium has a thickness from about 25 to about 250 microns.

26. The ionic transport medium of claim 3 wherein said fluorocarbon resin is confined primarily to the junction points of the fibers of said non-woven matte.

27. The combination of claim 12 wherein said electrically conducting material is a material of the group consisting of carbon, graphite, nickel, monel, tantalum, and metals of the platinum group.

28. The combination of claim 27 wherein said electrically conducting material comprises a porous graphite structure having deposited thereon a metal of the group consisting of platinum and nickel.

29. The combination of claim 12 wherein said retention agent has an average pore size less than 1 micron.

30. The combination of claim 12 wherein said second porous layer is exposed to a gaseous atmosphere on the side thereof opposite the side adjacent to said porous retention agent.

References Cited

UNITED STATES PATENTS

| | | | |
|---|---|---|---|
| 2,158,595 | 5/1939 | Slagle | 204—151 |
| 3,022,244 | 2/1962 | Le Blanc et al. | 204—266 |
| 3,116,355 | 12/1963 | Oswin | 264—317 |
| 3,463,713 | 8/1969 | Bregman et al. | 204—180 |
| 693,676 | 2/1902 | Willis | 136—146 |
| 2,132,702 | 10/1938 | Simpson | 117—53 |
| 2,230,271 | 2/1941 | Simpson | 19—146 |
| 2,400,091 | 5/1946 | Alfthan | 18—47.5 |
| 3,364,077 | 1/1968 | Arrance et al. | 136—146 |
| 3,508,966 | 4/1970 | Eisenberg | 136—6 |

JOHN H. MACK, Primary Examiner

A. C. PRESCOTT, Assistant Examiner

U.S. Cl. X.R.

204—180 P, 301; 136—153, 146